Nov. 8, 1955  E. B. ANDERSON  2,723,035
OIL FILTER
Filed Sept. 15, 1954  2 Sheets-Sheet 1
FIG.1.
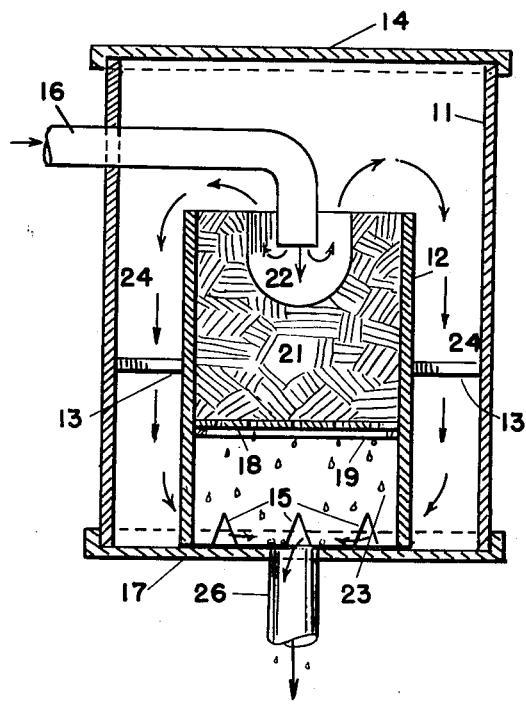
FIG.7.
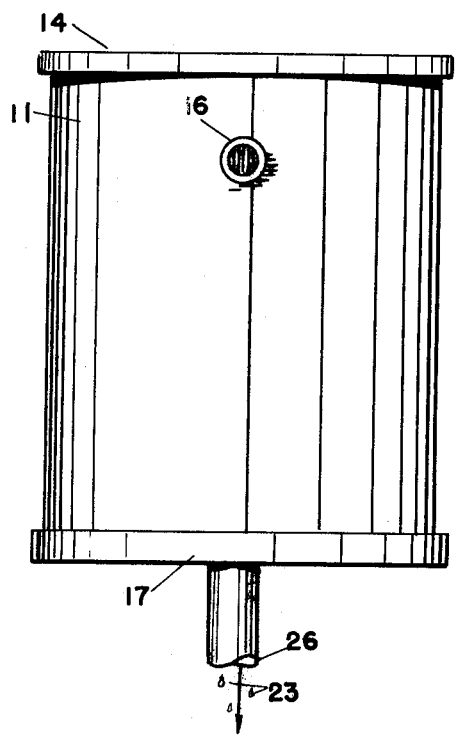
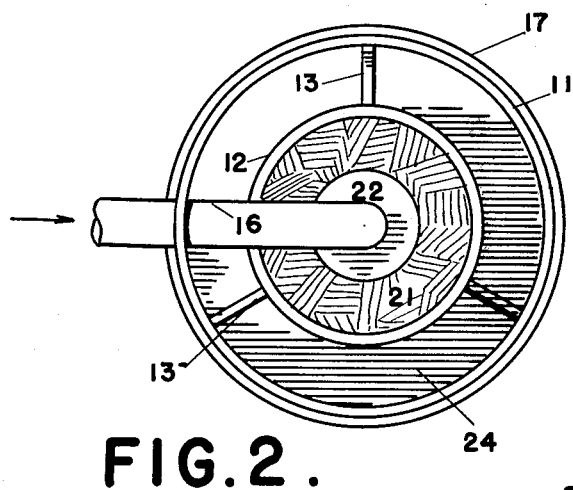
FIG.2.
INVENTOR.
EDWARD B. ANDERSON.
BY Howard J. Whelan.
ATTORNEY Nov. 8, 1955 — E. B. ANDERSON — 2,723,035

OIL FILTER

Filed Sept. 15, 1954 — 2 Sheets-Sheet 2

INVENTOR.
EDWARD B. ANDERSON.
BY Howard J. Whelan.
ATTORNEY

United States Patent Office 2,723,035
Patented Nov. 8, 1955

2,723,035

OIL FILTER

Edward B. Anderson, Baltimore, Md.

Application September 15, 1954, Serial No. 456,223

4 Claims. (Cl. 210—131)

The invention relates to filters and more particularly to the types of filters suitable for the removal of dirt and debris from oil incidentally contained in the circulating piping of a conventional refrigerating system.

A certain amount of lubricant in the form of an oil is employed in the piping of a refrigerating system in conjunction with the refrigerant. The refrigerant itself is used in its liquid and gaseous state in the system depending on its function at the moment and point of travel in the system. In this invention, the section of the piping wherein the refrigerant is flowing in its gaseous state is used for the insertion and assembly of a filter unit adapted to filter the oil without obstructing the free flow of the gaseous refrigerant, which needs no filtering. This is accomplished through the use of the unit, compact in form, and provided with an open channel for the passage of the gaseous refrigerant segregated from a cell containing waste or other suitable filtering material, through which the oil flows. The oil is freed from particles of dirt, debris, and metal by the waste and continues to the common piping and components of the refrigerating system included in the constituent parts of the latter.

The invention has among its objects the provision of a new and improved oil filtering device that will effectively remove particles of dirt and debris from the oil intermingled with the refrigerant medium of a refrigeration system, and be of simple and relatively inexpensive construction.

Another object of the invention is to provide a new and improved filtering device for cleaning the oil of dirt and debris in the circulating piping used by the refrigerant of a refrigerating system, without appreciably obstructing the passage of the refrigerant.

A further object of this invention is to provide a new and improved filtering device for a refrigerating system that will avoid one or more of the disadvantages and limitations of the prior art.

An additional object of the invention is to provide a new and improved filtering device for a refrigerating system that will have a free flow and gravity action to promote its operation.

Other objects will become apparent as the invention is explained more in detail.

For an adequate understanding of the invention reference is made to the accompanying drawings, wherein particular forms of the invention are shown by way of example, and an explanation of their features and included principles is outlined in the following description.

Referring to the drawings:

Figure 1 is a vertical sectional elevation of an oil filter unit embodying this invention; to show its interior structure;

Figure 2 is a plan view of Figure 1 with the cap removed;

Figure 7 is a side elevation of Figure 1.

Similar reference numerals refer to similar parts throughout the drawings.

Figure 3:
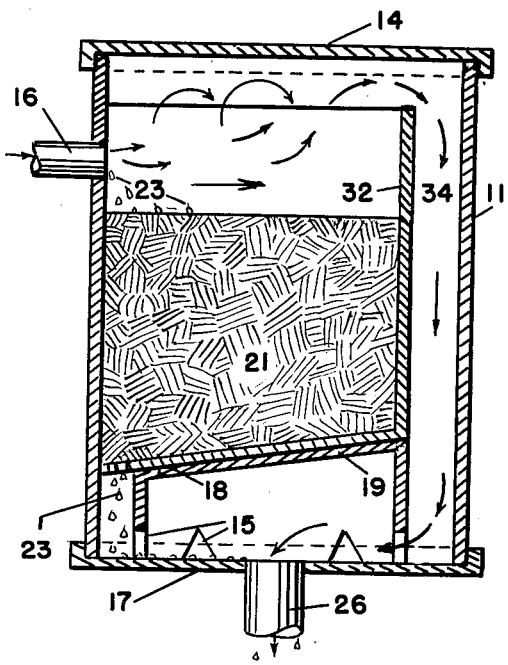
Figure 3 is a sectional elevation of a modified form of unit taken on line 3—3 of Figure 4.
Figure 4:
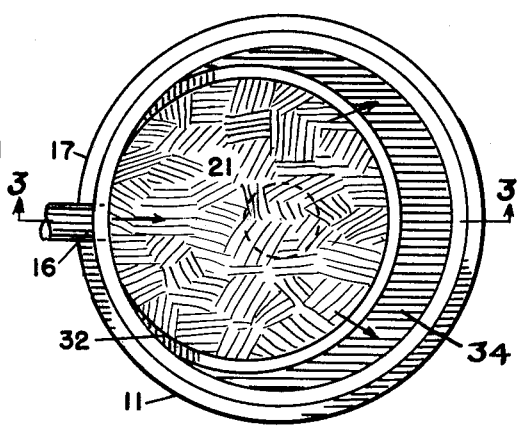
Figure 4 is a plan view of the modified form of construction shown in Figure 3 with its cap removed.

In the construction shown in Figure 1, an oil filter unit consists of an outer shell 11, of metal, plastic, glass or other suitable material. It is preferably of cylindrical shape with a cap or cover 14 closing in its upper end. The cap may be screwed on, fitted tight to stay in place by friction, or held by any other conventional method. A suitable inlet fitting 16 serves as a connection between the shell 11 and inflowing piping of a refrigerating system, not shown. The inlet fitting 16 is bent to the form of an elbow with one end projecting downwardly into the axial area of the cylinder 12, and its other end projecting through the wall near the upper end of the shell 11. This connection serves as an inlet to the shell. Through it pass the gaseous refrigerant and incidental oil lubricant 23. The shell is closed in at the bottom by a screwed-on or frictional fitted disc-like plate 17 having an outlet fitting 26 flush at the inside face and projected vertically downward exteriorly preferably with a standard union attachment on it. The removal of the cap 14 permits access to the interior of the shell for cleaning or other purposes. Gaskets may be used between the shell ends and the cap 14 and plate 17 to keep the unit air and oil tight, in accordance with common practice.

The main filter cell or cylinder 12 is also cylindrical and disposed centrally in the shell 11 leaving an ample annular space 24 around it. Its walls are provided with three narrow exterior lugs 13 that extend out radially to hold it in position rigidly. The cell or cylinder 12 is open at both ends and sets securely against the upper face of the plate 17. The wall adjacent the plate 17 is provided with inverted V-shaped slots 15 spaced apart and providing openings through which the gaseous refrigerant coming down the annular space 24 and passing through into the outlet piping 26. A screen 18 of circular form of suitable perforated plate or wire mesh is rested on a circular ridge 19 provided on the interior surface of the wall of the cell and is situated just above the spaces of the slots 15. Waste of standard or other suitable filler material 21 is packed into the cell until it contacts the screen and fills the cell. A depression 22 is left in its axial upper portion deep and wide enough to allow the fitting 16 to project into it with ample space all around to permit the gaseous refrigerant to flow through the annular space 24 and the oil to drip through the waste and the gas and the cleansed oil to pass through outlet 26 and back into the system. The refrigerant and the direction of its flow is indicated by arrows in the drawings. Oil 23 is indicated by tear-drop particles. The unit is assembled in the piping arrangement of a refrigerating system through the use of the unions or other standard connections, and placed so its axis is vertically disposed. The unit is placed in the location where the system employs the refrigerant in its gaseous state. It flows through the unit, in the direction indicated by the arrows, and carries with it the incidental small amount of oil 23 in liquid form. The refrigerant passes out of the fitting 16 into the depression space 22 and continues to the annular space 24, through the slots 15 and out of the fitting 26 to the piping of the system continuing therefrom. The oil drips from the fitting 16 into the waste by gravity and continues through the latter and is cleaned of dirt particles by it. Eventually the oil reaches the bottom portion of the waste or filter material and passes through the screen 18 to the plate 17, where it continues out of the outlet 26 into the system, to be reused therein. The structure of the filter unit indicated in Figure 3 provides a cylindrical cell 32 that is offset towards one side of the wall of the shell 11 so the flow of the refrigerant will pass through a quasi-annular space 34 leading from a location near the cap 14 and through V-slots 15 to the outlet fitting 26. The inlet fitting elbow 16 is eliminated and in its place a stub fitting is provided and made flush with the inner surface of the shell wall. The waste or filler material 21 is not provided with a depression as in the original form as there is no elbow on the fitting to need it. Instead the cell is made cup-shaped at the top and functions the same as in Figure 1. This modified form tends to keep the refrigerant and oil separated while flowing through the unit. Lugs 13 are eliminated, screen 18 is tilted. Other parts are similar to those employed in the original form.

Figure 5:
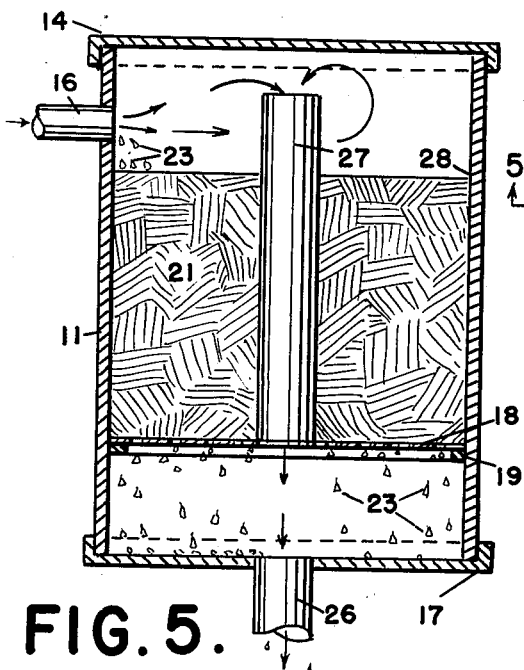
Figure 5 is a sectional elevation of another modified form of construction taken on line 5—5 of Figure 6.
Figure 6:
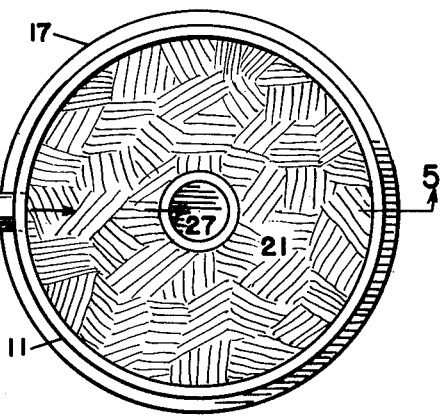
Figure 6 is a plan view of Figure 5 with the cap removed.

The modified form indicated in Figure 5 uses a central tube 27 for the refrigerant to pass through. The shell 28 encases the filter material 21 and requires no lugs. It rests on a circular ridge 19 that raises the cell above the bottom plate 17, as indicated in the drawing. The general operation is apparent and needs no detailed explanation in view of the previous outline.

The general features of the units include a compact construction, with parts accessible for examination, repair or renewal. It works without the use of pressure. The refrigerant has a free flow and the oil is subject to an effective filtering by the waste. The simplicity of the structure enables the cost of production to be relatively low, and it does not detract from the appearance of the system.

While several forms of the invention have been shown and illustrated, it is not desired to limit this application for Letters Patent to such forms, as it is appreciated that other designs could be evolved and manufactured that would employ the same principles and come within the scope of the appended claims.

Having thus described the invention, what is claimed is:

1. A filter unit for use in a refrigerating system comprising in combination, an elongated shell adapted for vertical placement having its upper end removably closed in and its lower end provided with an outlet, an inlet being located in the wall of said shell adjacent said upper end, a cell disposed in said shell and including means for holding it spaced from the inside wall of said shell to provide a space from the top to the bottom for the flow of the refrigerant in a gaseous state as it passes from the inlet to the outlet, filter material in said cell positioned to bring its upper portion below the inlet so the oil in said system can drop and percolate through said material on its way to said outlet and then to continue through said system, a screen for supporting the material in the cell without interfering with the filtered oil passing therethrough, said filtering material including a depression adjacent said inlet for facilitating the dropping of the oil therein and guiding the gaseous refrigerant flowing through the shell without passing through said filtering material, lugs for maintaining the position of the cell in the said shell, an elbow on the inlet to direct the oil and refrigerant in predetermined directions independent of each other to said outlet.

2. A filter unit for use in a refrigerating system comprising in combination, an elongated shell adapted for vertical placement having its upper end removably closed in and its lower end provided with an outlet, an inlet being located in the wall of said shell adjacent said upper end, a cell disposed in said shell and including means for holding it spaced from the inside wall of said shell to provide a space from the top to the bottom for the flow of the refrigerant in a gaseous state as it passes from the inlet to the outlet, filter material in said cell positioned to bring its upper portion below the inlet so the oil in said system can drop and percolate through said material on its way to said outlet and then to continue through said system, a screen for supporting the material in the cell without interfering with the filtered oil passing therethrough said filtering material including a depression adjacent said inlet for facilitating the dropping of the oil therein and guiding the gaseous refrigerant flowing through the shell without passing through said filtering material, lugs for maintaining the position of the cell in the said shell, an elbow on the inlet to direct the oil and refrigerant in predetermined directions independent of each other to said outlet, and means providing in the wall of the shell for facilitating the flow of refrigerant to the outlet under said cell.

3. A filter unit for use in a refrigerating system comprising in combination, an elongated shell adapted for vertical placement having its upper end removably closed in and its lower end provided with an outlet, an inlet being located in the wall of said shell adjacent said upper end, a cell disposed in said shell and including means for holding it spaced from the inside wall of said shell to provide a space from the top to the bottom for the flow of the refrigerant in a gaseous state as it passes from the inlet to the outlet, filter material in said cell positioned to bring its upper portion below the inlet so the oil in said system can drop and percolate through said material on its way to said outlet and then to continue through said system, a screen for supporting the material in the cell without interfering with the filtered oil passing therethrough, said filtering material including a depression adjacent said inlet for facilitating the dropping of the oil therein and guiding the gaseous refrigerant flowing through the shell without passing through said filtering material, lugs for maintaining the position of the cell in the said shell, an elbow on the inlet to direct the oil and refrigerant in predetermined directions independent of each other to said outlet, means providing in the wall of the shell for facilitating the flow of refrigerant to the outlet under said cell, said shell being cylindrical with the cell therein also cylindrical positioned to make the space between them of annular form, a bottom plate holding said outlet removably attached to said shell to permit access to the interior thereof for inspection or renewal.

4. A filter unit for use in a refrigerating system comprising in combination, an elongated shell of regular cross-section and adapted for vertical positioning on its longitudinal axis, a removable cap on the upper end of the shell, a removable bottom plate on the lower end thereof, and containing a centrally located outlet orifice therein for attachment to said system, an inlet orifice disposed in the wall of the shell adjacent said cap and horizontally disposed for directing gaseous refrigerant from the system and oil into the shell, a cell having its upper and lower ends open and arranged in parallel relation to each other and at right angles to the vertical axis of the shell, said cell being spaced to provide an annular space between its wall and that of the shell, said space being adapted to pass the refrigerant through it, a screen adjacent the bottom of the cell, filter material packed in the cell and rested on the screen for receiving oil from the inlet orifice and cleaning it as it travels to the bottom of the cell and through the screen onto the said bottom plate and the outlet orifice, and means for connecting the unit to the piping of said system, and a chamber under the cell for the oil and gas to gather without appreciable obstruction on their way to said outlet.

References Cited in the file of this patent

UNITED STATES PATENTS

| 2,031,935 | Cuno | Feb. 25, 1936 |
| 2,190,138 | Smith et al. | Feb. 13, 1940 |
| 2,548,335 | Balogh | Apr. 10, 1951 |